United States Patent
Naruse et al.

(10) Patent No.: US 9,481,770 B2
(45) Date of Patent: Nov. 1, 2016

(54) CARBON FIBER COMPOSITE MATERIAL

(71) Applicant: Toray Industries, Inc., Tokyo (JP)

(72) Inventors: Yoshihiro Naruse, Nagoya (JP); Katsuhiro Miyoshi, Nagoya (JP); Takashi Shimada, Otsu (JP); Takafumi Hashimoto, Nagoya (JP); Tetsuya Ohara, Otsu (JP)

(73) Assignee: Toray Industries, Inc. (JP)

( * ) Notice: Subject to any disclaimer, the term of this patent is extended or adjusted under 35 U.S.C. 154(b) by 177 days.

(21) Appl. No.: 14/403,677

(22) PCT Filed: May 15, 2013

(86) PCT No.: PCT/JP2013/063520
§ 371 (c)(1),
(2) Date: Nov. 25, 2014

(87) PCT Pub. No.: WO2013/179891
PCT Pub. Date: Dec. 5, 2013

(65) Prior Publication Data
US 2015/0183941 A1   Jul. 2, 2015

(30) Foreign Application Priority Data

May 29, 2012 (JP) .................. 2012-121738

(51) Int. Cl.
C08J 5/04 (2006.01)
C08J 5/06 (2006.01)

(52) U.S. Cl.
CPC ......... *C08J 5/06* (2013.01); *C08J 5/042* (2013.01); *B32B 2250/05* (2013.01); *B32B 2260/046* (2013.01); *B32B 2262/106* (2013.01); *B32B 2305/076* (2013.01); *B32B 2305/28* (2013.01); *B32B 2307/54* (2013.01); *C08J 2377/02* (2013.01)

(58) Field of Classification Search
CPC ..... C08J 5/042; C08J 5/06; B32B 2260/046; B32B 2262/106; B32B 2307/54; B32B 2305/28; B32B 2305/076; B32B 2250/05
See application file for complete search history.

(56) References Cited

U.S. PATENT DOCUMENTS

2011/0143110 A1   6/2011   Tsuchiya et al.
2013/0317161 A1†  11/2013  Konagai

FOREIGN PATENT DOCUMENTS

| JP | 2002-212311 | † | 7/2002 |
| JP | 2003-183692 | | 7/2003 |
| JP | 2004-169225 | | 6/2004 |
| JP | 2004-43985 | † | 12/2004 |
| JP | 2007-253573 | | 10/2007 |
| JP | 2007-263360 | | 10/2007 |
| JP | 2008-201005 | | 9/2008 |
| JP | 3152748 U | † | 8/2009 |
| JP | 2010-235779 | | 10/2010 |
| WO | 2012165076 A1 | † | 12/2012 |

† cited by third party

*Primary Examiner* — Richard A Huhn
(74) *Attorney, Agent, or Firm* — DLA Piper LLP (US)

(57) ABSTRACT

A carbon fiber composite material which includes a carbon fiber sheet as a reinforcing material and a thermoplastic resin as a matrix resin, the carbon fiber sheet exhibiting a work per areal weight of $1 \times 10^{-3}$ to $30 \times 10^{-3}$ [(N·mm)/(g/m$^2$)] in a tensile test using a specimen having a width of 25 mm. The carbon fiber composite material exhibits excellent flowability in molding and ensures excellent moldability even when molded into a complicated shape. Further, the composite material can yield a molded product which has high mechanical properties with minimized dispersion, thus being suitable for press molding.

18 Claims, 6 Drawing Sheets

CARBON FIBER COMPOSITE MATERIAL

TECHNICAL FIELD

This disclosure relates to a carbon fiber composite material and, specifically, to a carbon fiber composite material which can produce a molded product having high mechanical properties with minimized dispersion, with excellent moldability even when molded into a complicated shape.

BACKGROUND

To produce a molded product of a carbon fiber reinforced plastic, for example, it is known that a sheet-like carbon fiber composite material is used as a raw material for molding, and the carbon fiber composite material is press molded (stamping molding) into a predetermined shape at predetermined conditions of temperature and pressure. In such a molding, in particular, when the shape to be molded is a complicated shape, the carbon fiber composite material as a raw material for molding is required with a high flowability to be molded into a desired carbon fiber reinforced form over the all parts of the complicated shape. If the flowability of the carbon fiber composite material is low, not only a good moldability cannot be obtained, but also the mechanical properties of a molded product become low, and there is a possibility that the dispersion of the mechanical properties becomes great.

As conventional technologies, in JP-A-2003-183692, although a carbon fiber sheet excellent in tensile strength, prepared by stacking a carbon fiber non-woven fabric and a carbon fiber refined material at a condition to entangle them by needle punch or water jet, is disclosed, even if such a sheet is used as a carbon fiber composite material as a raw material for molding as described above, because entanglement of fibers with each other is strong, flowability at the time of molding is low.

Further, in JP-A-2004-169225, although a reinforcement material of a fiber reinforced plastic excellent in tensile strength, prepared by bundling inorganic fibers (glass fibers, carbon fibers or the like) with a natural polymer and binding the obtained fiber bundles with a binder (a thermoplastic resin, a thermosetting resin, an elastomer or the like), is disclosed, because the fibers are bound to each other by the binder, the flowability at the time of molding is low. Further, a natural polymer such as a starch is used as the bundling agent, the bundling agent is deteriorated when made into a composite material by impregnating a thermoplastic resin, and therefore, it is difficult to obtain a molded product having high properties.

Furthermore, in JP-A-2008-201005, although a carbon fiber sheet with a high plane flatness and a high tensile strength, prepared by stacking a carbon fiber felt and a carbon fiber paper, is disclosed, even if such a sheet is used as a carbon fiber composite material, because the carbon fiber paper part is high in dispersibility of single fibers of carbon fibers but strong in entanglement of carbon fibers with each other, the flowability at the time of molding is low.

It could therefore be helpful to provide a carbon fiber composite material which can exhibit a high flowability at the time of molding, and which can yield a molded product having good mechanical properties with minimized dispersion, that have not been achieved in conventional carbon fiber composite materials.

SUMMARY

We provide a carbon fiber composite material including a carbon fiber sheet as a reinforcing material and a thermoplastic resin as a matrix resin, said carbon fiber sheet exhibiting a work per areal weight of $1 \times 10^{-3}$ to $30 \times 10^{-3}$ $[(N \cdot mm)/(g/m^2)]$ in a tensile test using a specimen having a width of 25 mm.

We also provide the carbon fiber composite material, wherein a slope after reaching the maximum load in a load $[N/(g/m^2)] \times 10^{-3}$-strain [%] curve obtained in said tensile test of said carbon fiber sheet is $-0.1$ to $-0.01$.

We further provide the carbon fiber composite material, wherein a slope after applying an initial load in a load $[N/(g/m^2)] \times 10^{-3}$-strain [%] curve obtained in said tensile test of said carbon fiber sheet is 0.1 to 0.7.

We also provide the carbon fiber composite material, wherein a fiber length of carbon fibers forming said carbon fiber sheet is 5 to 30 mm.

We further provide the carbon fiber composite material, wherein said carbon fiber sheet is formed from a starting material of a sheet-like carbon fiber aggregate formed from carbon fiber bundles cut at a predetermined length and thermoplastic resin short fibers.

We also provide the carbon fiber composite material, wherein a proportion Y, relative to the total weight of carbon fibers, of carbon fiber bundles for which $Mn/(Ln \times D)$ is $8.5 \times 10^{-1}$ (mg/mm$^2$) or more, is $30 \leq Y > 90$ (wt %), an average value X of $Mn/Ln$ for said carbon fiber bundles is $1.1 \times 10^{-2} \leq X \leq 8.1 \times 10^{-2}$ (mg/mm), and said Y satisfies $Y \geq 100X + 30$, where Mn: weight of carbon fiber bundles, Ln: fiber length, D: fiber diameter.

We further provide the carbon fiber composite material, wherein with respect to said carbon fiber bundles forming said carbon fiber sheet, a number average "x" of numbers of carbon fibers forming carbon fiber bundles each having a weight of 0.01 mg or more and a number of carbon fibers of 90 or more for forming each carbon fiber bundle is 90 to 1,000/bundle, and a standard deviation σ of said numbers of carbon fibers forming said carbon fiber bundles is 50 to 500.

We also provide the carbon fiber composite material, wherein a sizing agent is applied to said carbon fiber bundles.

We further provide the carbon fiber composite material, wherein a coefficient of fluidity, represented as a ratio of an area after being pressed at conditions of predetermined temperature and pressure to an area before being pressed, is 170% or more.

We also provide a carbon fiber reinforced plastic press molded with a carbon fiber composite material.

EXPLANATION OF SYMBOLS

Figure 1:
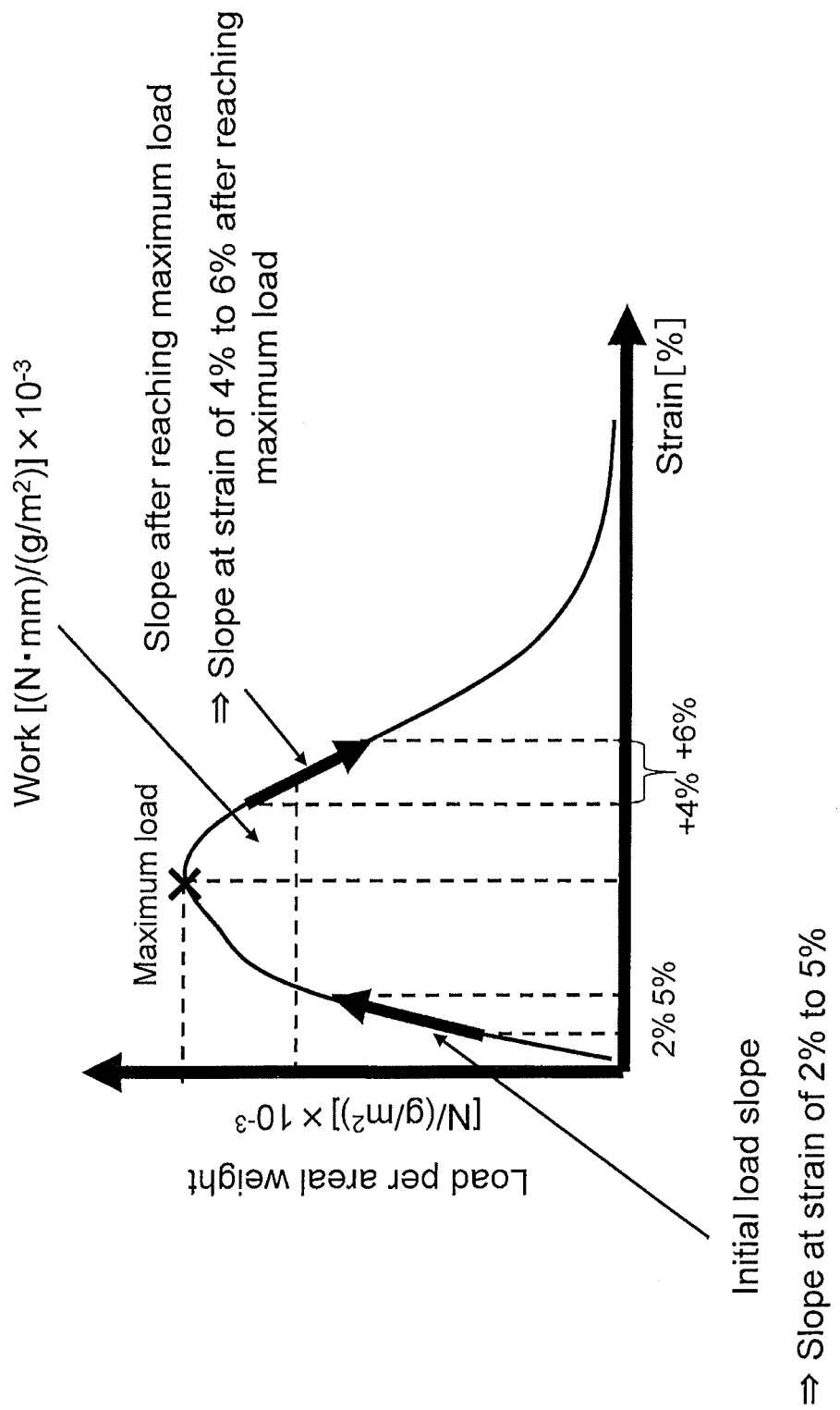
FIG. 1 is an explanation diagram of respective properties.

1: carding machine
2: cylinder roll
3: take-in roll
4: doffer roll

5: worker roll
6: stripper roll
7: feed roll
8: belt conveyor
9: discontinuous carbon fibers
10: sheet-like web
11: air laid machine
12: drum
13: pin cylinder
14: wire
15: suction box
101: carbon fiber composite material before flow
102: press machine
103: carbon fiber reinforced plastic after press molding

DETAILED DESCRIPTION

Our carbon fiber composite material comprises a carbon fiber sheet as a reinforcing material and a thermoplastic resin as a matrix resin, the carbon fiber sheet exhibiting a work per areal weight of $1\times10^{-3}$ to $30\times10^{-3}$ [(N·mm)/(g/m$^2$)] in a tensile test using a specimen having a width of 25 mm. The above-described work per areal weight is preferably $1\times10^{-3}$ to $25\times10^{-3}$ [(N·mm)/(g/m$^2$)], more preferably $1\times10^{-3}$ to $14\times10^{-3}$ [(N·mm)/(g/m$^2$)], further preferably $1\times10^{-3}$ to $10\times10^{-3}$ [(N·mm)/(g/m$^2$)], and particularly preferably $1\times10^{-3}$ to $5\times10^{-3}$ [(N·mm)/(g/m$^2$)].

In such a carbon fiber composite material, the work per areal weight of the above-described carbon fiber sheet can be determined as an integral value (an area) of a load-strain curve obtained by the above-described tensile test (hereinafter, also referred to as a "tensile curve") as described later, and the smaller this area is, an energy necessary to elongate the carbon fiber sheet such as a carbon fiber mat may be small. Therefore, since the work (energy) necessary to elongate the carbon fiber sheet up to a desired form may be small by controlling the work per areal weight of the above-described carbon fiber sheet in a low-value range when the carbon fiber composite material comprising such a carbon fiber sheet and a matrix resin is used as a material for molding to mold a target molded product, the flowability of the material for molding is enhanced and, therefore, an excellent moldability can be realized. As a result, even in a molded product having a complicated shape, it can be molded well and easily with a high flowability, and because the carbon fibers and the matrix resin can be well distributed at a desirable form (for example, at a condition capable of keeping a desirable proportion) over the entire region by the high flowability, high mechanical properties of the molded product can be realized and the dispersion of the mechanical properties can be suppressed small.

It is preferred that a slope after reaching the maximum load in a load [N/(g/m$^2$)]×10$^{-3}$-strain [%] curve obtained in the above-described tensile test of the carbon fiber sheet is in a range of −0.1 to −0.01. This slope is determined, as described later, as a slope of the tensile curve when further elongated by 4 to 6% after reaching the maximum load per areal weight in the tensile test and as a slope when decreases from the maximum load (peak) of the tensile curve. Because the smaller the absolute value of this slope is (the milder the slope is), the more slowly the carbon fiber sheet is elongated without being torn off, the dispersion of the distribution of carbon fibers (for example, dispersion of fiber volume content), after the carbon fiber composite material is flowed and a molded product is molded, becomes smaller, and the properties of the molded product are stabilized. This slope after reaching the maximum load is more preferably −0.07 to −0.01, further preferably −0.04 to −0.01.

Further, it is preferred that a slope after applying an initial load in the load [N/(g/m$^2$)]×10$^{-3}$-strain [%] curve obtained in the above-described tensile test of the carbon fiber sheet is 0.1 to 0.7. As described later, this slope is a slope of an initial rising up of the tensile curve when applied with the load per areal weight in the tensile test, and because the smaller this slope is, at the weaker force the carbon fiber sheet is elongated, the resistance against initiating the flow of the carbon fiber composite material becomes smaller, and therefore, it becomes possible to mold the molded product with a higher flowability. This slope at the time of initial load is more preferably 0.1 to 0.5, further preferably 0.1 to 0.3.

Further, it is preferred that a fiber length of carbon fibers forming the above-described carbon fiber sheet is 5 to 30 mm. By forming the carbon fiber sheet with the carbon fibers having such a fiber length, it becomes possible to flow the carbon fiber composite material while maintaining a condition where carbon fibers are well distributed, the dispersion of the distribution of carbon fibers (for example, dispersion of fiber volume content) after a molded product is molded becomes small, the mechanical properties of the molded product are stabilized, and the dispersion of the mechanical properties also becomes small. This fiber length of carbon fibers is more preferably 10 to 25 mm, further preferably 15 to 20 mm.

Further, as a preferable example, the above-described carbon fiber sheet may be formed from a starting material of a sheet-like carbon fiber aggregate formed from carbon fiber bundles cut at a predetermined length and thermoplastic resin short fibers. Entanglements of carbon fibers with each other can be easily suppressed in the carbon fiber composite material are otherwise too strong, thereby controlling the work per areal weight of the carbon fiber sheet securely within our range.

It is preferred that a proportion Y, relative to the total weight of carbon fibers, of carbon fiber bundles (1) for which Mn/(Ln×D) is $8.5\times10^{-1}$ (mg/mm$^2$) or more, is 30≤Y<90 (wt %), an average value X of Mn/Ln for the carbon fiber bundles (1) is $1.1\times10^{-2}≤X≤8.1\times10^{-2}$ (mg/mm), and the Y satisfies Y≥100X+30 where Mn: weight of carbon fiber bundles, Ln: fiber length of carbon fibers, D: fiber diameter of carbon fibers.

Further, in the above-described example, it is preferred that, with respect to the carbon fiber bundles in the carbon fiber sheet, a number average "x" of numbers of carbon fibers forming carbon fiber bundles (3) each having a number of carbon fibers of 90 or more for forming each carbon fiber bundle is 90 to 1,000. From the viewpoint of increase of a strength utilization factor of carbon fibers described later and surface appearance of a molded product when made into a carbon fiber composite material, the number average "x" of numbers of carbon fibers forming the bundles is more preferably 90 to 600, and further preferably 90 to 500. From the viewpoint of increasing the content of carbon fibers and obtaining a high elastic modulus when made into a carbon fiber composite material, the number average "x" is more preferably 300 to 1,000, and further preferably 500 to 1,000. If the number average "x" of the carbon fiber bundles is lower than 90, the number of entanglement of fibers with each other increases, and flowability is deteriorated. If more than 1,000, the mechanical properties and flowability of carbon fibers to small parts such as a rib part are deteriorated, and the dispersion of the mechanical properties becomes great.

It is preferred that a standard deviation σ of numbers $x_n$ of carbon fibers forming the above-described carbon fiber bundles (3) in the carbon fiber sheet is 50≤σ≤500, and by a condition where the carbon fiber bundles are distributed in the carbon fiber sheet at a dispersed condition, high flowability and mechanical properties can be both achieved, and a carbon fiber non-woven fabric small in dispersion of mechanical properties and also excellent in carbon fiber followability to small parts can be obtained. If the above-described standard deviation σ is lower than 50, the flowability is deteriorated, and if the above-described standard deviation σ is more than 500, the mechanical properties are deteriorated, and the dispersion of the mechanical properties becomes great. The above-described standard deviation σ is more preferably 100≤σ≤350, further preferably 150≤σ≤350, and more further preferably 150≤σ≤300.

By thus satisfying the specified ranges, as shown also in the results of Examples described later, a high flowability can be obtained when a carbon fiber composite material using it is molded, and high mechanical properties of a molded product can be realized, the dispersion of the mechanical properties is small, and an excellent followability of carbon fibers to small parts, for example, to rib parts and the like, can be exhibited.

Further, it is preferred that a sizing agent is applied to the above-described carbon fiber bundles. By providing the sizing agent, because the carbon fiber bundles, which form the carbon fiber sheet and which are cut at a predetermined length, are maintained at fiber bundle forms without being greatly loosened with the carbon fibers, it is suppressed more securely that the entanglement of carbon fibers with each other in the carbon fiber composite material becomes too strong, thereby controlling the work per areal weight of the carbon fiber sheet within our low range more securely.

Further, in the carbon fiber composite material, as described above, a high flowability is exhibited when the carbon fiber composite material is used as a raw material for molding to serve a press molding, and this flowability can be expressed by a coefficient of fluidity represented as a ratio of an area after being pressed at conditions of predetermined temperature and pressure described later to an area before being pressed. This coefficient of fluidity is preferably 170% or more as in Examples described later.

Furthermore, we also provide a carbon fiber reinforced plastic press molded (for example, stamping molded) with the carbon fiber composite material according to the present invention as described above. In this carbon fiber reinforced plastic as a molded product, because the carbon fiber composite material exhibits a high flowability when molded as described above even if molded into a complicated shape, carbon fibers as reinforcing fibers are well distributed over the entire molded product, good mechanical properties of the molded product can be achieved, and the dispersion of the mechanical properties can be suppressed small.

Thus, according to the carbon fiber composite material, a carbon fiber composite material extremely useful for use in press molding can be provided wherein the flowability when molded is excellent, an excellent moldability can be obtained even in a molding into a complicated shape, the mechanical properties of the molded product are high, and the dispersion of the mechanical properties can be suppressed small. Therefore, by molding using this carbon fiber composite material, a molded product with desired characteristics can be obtained easily and securely.

Hereinafter, our materials will be explained in detail mainly with respect to Examples.

The carbon fiber composite material comprising a carbon fiber sheet, exhibiting a work per areal weight of $1 \times 10^{-3}$ to $30 \times 10^{-3}$ $[(N \cdot mm)/(g/m^2)]$ in a tensile test using a specimen having a width of 25 mm, as a reinforcing material and a thermoplastic resin as a matrix resin, and for specifying this carbon fiber composite material, a load $[N/(g/m^2)] \times 10^{-3}$-strain [%] curve obtained in the above-described tensile test of the above-described carbon fiber sheet plays a great role. Further, to evaluate the performance of this carbon fiber composite material, a coefficient of fluidity, represented as a ratio of an area after being pressed at conditions of predetermined temperature and pressure to an area before being pressed, plays a great role. Moreover, as aforementioned, in the carbon fiber composite material, it is preferred that the carbon fibers forming the carbon fiber sheet is left as much as possible at a specified carbon fiber bundle form and at specified conditions, and the determination of the carbon fiber bundles also plays a great role. Therefore, first, these will be explained.

As to Tensile Test

Figure 2:
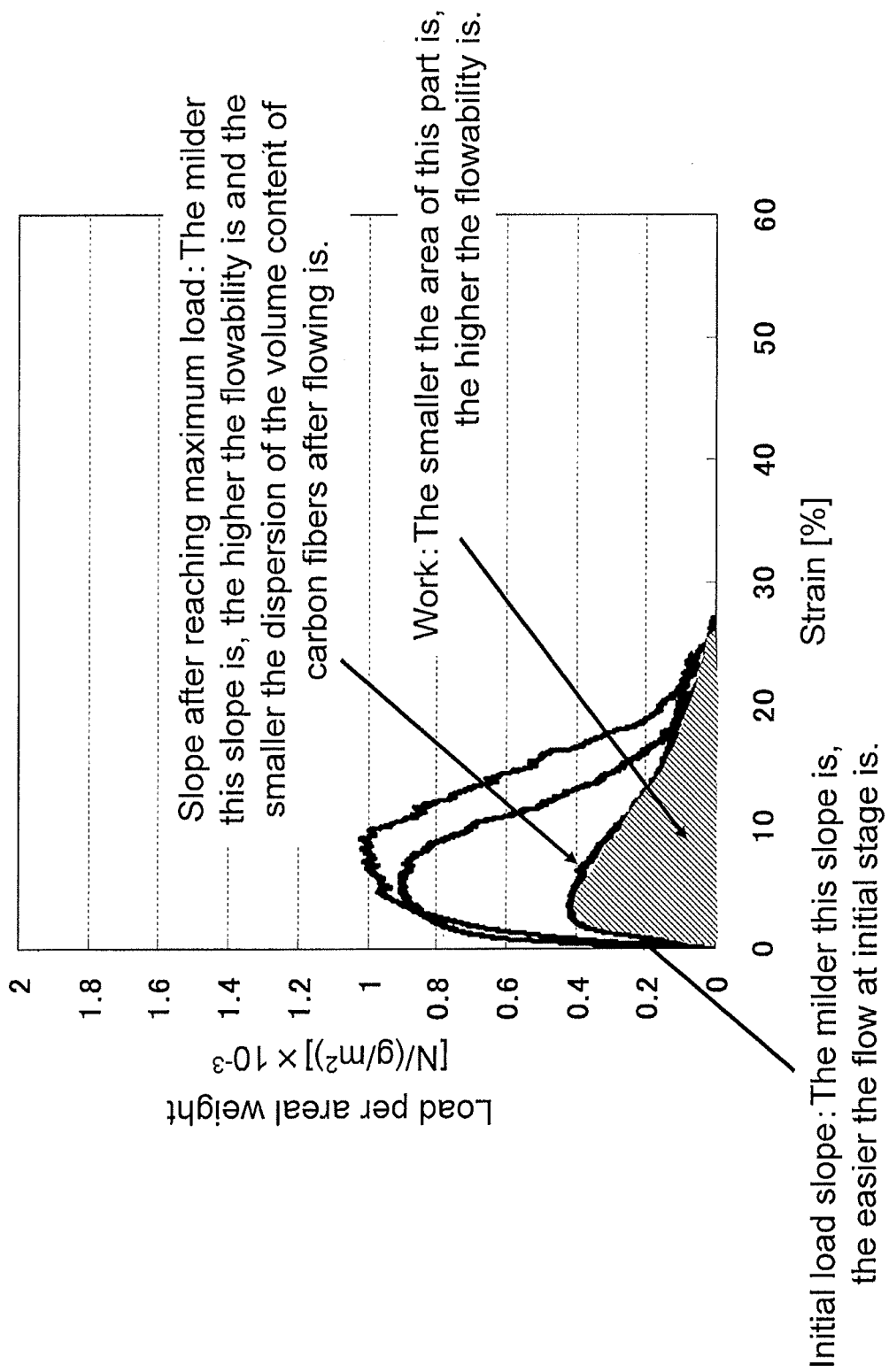
FIG. 2 is an explanation diagram of technical meanings of the respective properties shown in FIG. 1.

Each flat plate of carbon fiber composite materials prepared in Examples and Comparative Examples was heated for one hour in an electric furnace heated at 500° C. to burn off organic substances such as a matrix resin. The obtained carbon fiber mat was cut out into 5 pieces each having a width of 25 mm and a length of 250 mm in 0° direction and 90° direction, respectively, to obtain respective specimens. The obtained specimens were served to JIS-L-1096-8.14.1-A method (strip method) (2010), and each of the 5 specimens was elongated at a gripping distance of 100 mm and a tensile speed of 100 mm/min. using a constant-speed elongation type tensile tester. By simply averaging the obtained results, tensile curves, which were load $[N/(g/m^2)] \times 10^{-3}$-strain [%] curves in 0° direction and 90° direction, were made, respectively. Examples of the tensile curves are shown in FIG. 1 and FIG. 2.

(1) Work:

The work can be determined by integrating the values of the tensile curves obtained as described above (corresponding to determination of an area of a part surrounded by a characteristic curve, represented by scales of the axis of ordinates (load per areal weight) and the axis of abscissas (strain), and the axis of abscissas), and after the respective works in 0° direction and 90° direction were determined, the determined works were simply averaged. The smaller the area of the above-described surrounded part is, the smaller the energy required to elongate the carbon fiber sheet may be, and the flowability as the carbon fiber composite material is higher.

(2) Slope after Reaching Maximum Load:

In the above-described tensile curve, as shown in FIG. 1, after reaching the maximum load, a slope of a zone in which elongated further by 4% to 6% was determined. As shown in FIG. 2, the milder this slope is, the higher the flowability is and the smaller the dispersion of the volume content of carbon fibers after flowing is.

(3) Initial Load Slope:

In the above-described tensile curve, as shown in FIG. 1, a slope of a zone in which elongated by 2% to 5% from the time of applying the initial load was determined. As shown in FIG. 2, the milder this slope is, the easier the flow at the initial stage is.

(4) As to Flow Test (Flowability in Press Molding (for Example, Stamping Molding)):

When the Matrix Resin is an Polyamide

Figure 3:
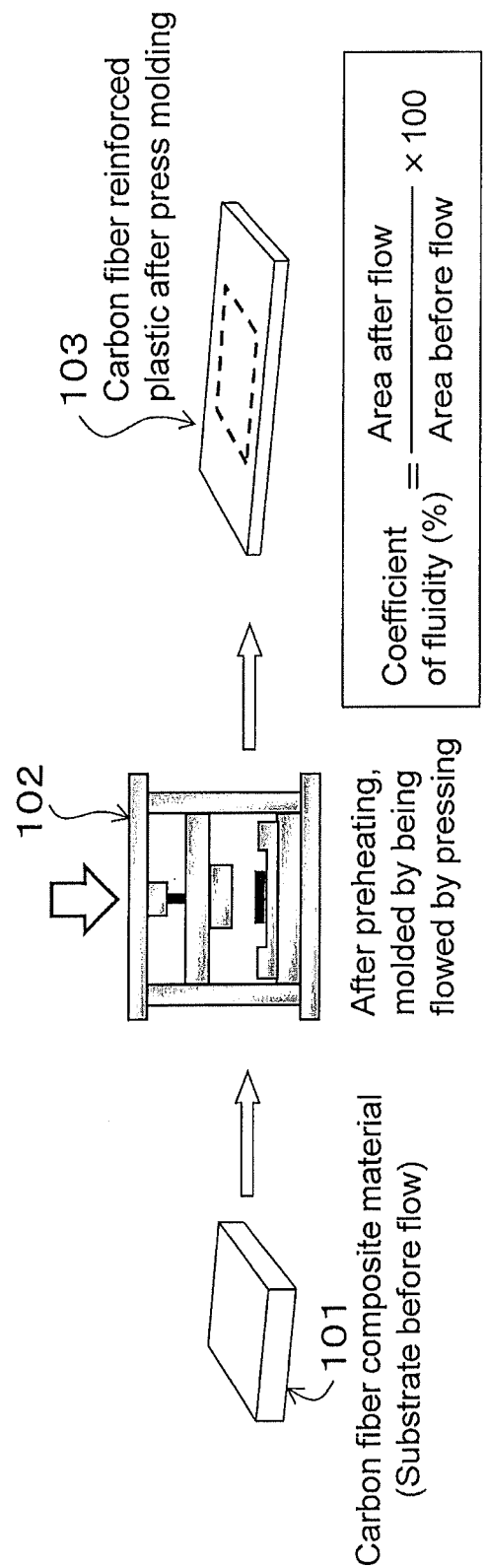
FIG. 3 is an explanation diagram of a coefficient of fluidity.

As shown in FIG. 3, after two sheets of carbon fiber composite materials 101 each having a dimension of 100 mm×100 mm×2 mm were preheated at 260° C., the two sheets were stacked and placed in a press machine 102 heated at 120° C., and pressed at 20 MPa for 5 seconds, and molded by being flowed. An area A2 of the sheet of a carbon fiber reinforced plastic 103 after pressing due to this press molding (after flow) and an area A1 of the sheet before molding (before flow) were determined, and A2/A1 was used as a coefficient of fluidity (%) for evaluation of flowability.

When the Matrix Resin is a Polypropylene "PP"

Similar to the above-described manner, after two sheets of carbon fiber composite materials each having a dimension of 100 mm×100 mm×2 mm were preheated at 230° C., the two sheets were stacked and placed in the press machine heated at 80° C., and pressed at 20 MPa for 5 seconds. An area A2 after this pressing and an area A1 before the pressing were determined, and A2/A1 was determined as a coefficient of fluidity (%).

(5) Carbon Fiber Volume Content in Carbon Fiber Composite Material (Vf):

A sample of about 2 g was cut out from the carbon fiber composite material press molded product after the above-described flow test, and its mass was determined. Thereafter, the sample was heated for one hour in an electric furnace heated at 500° C. to burn off organic substances such as a matrix resin. After cooling down to a room temperature, the mass of residual carbon fibers was determined. A ratio of the mass of the carbon fibers to the mass of the sample before burning off organic substances such as a matrix resin was determined, and it is defined as a content of carbon fibers.

(6) Method of Determining Carbon Fiber Bundle:

A sample of 100 mm×100 mm was cut out from a carbon fiber composite material, and thereafter, the sample was heated for about one hour in an electric furnace heated at 500° C. to burn off organic substances such as a matrix resin. After the mass of residual carbon fiber aggregates was determined after cooling it down to a room temperature, all the carbon fiber bundles were extracted by a pincette from the carbon fiber aggregates. With respect to all the extracted carbon fiber bundles, using a balance capable of measuring up at a scale of 1/10,000 g, weight Mn and length Ln of each carbon fiber bundle are measured. After the measurement, for each bundle, Mn/Ln, Mn/(Ln×D), and a number of single fibers of carbon fibers forming the carbon fiber bundle: $X_n=Mn/(Ln\times F)$ are calculated where, D represents a diameter of a carbon fiber, F represents a fineness of a single fiber of a carbon fiber, and $X_n$ represents a number of single fibers forming a carbon fiber bundle.

In the determination, a fiber bundle with a value of Mn/(Ln×D) of $8.5\times10^{-1}$ (mg/mm$^2$) or more is defined as a carbon fiber bundle (1), the total weight of carbon fiber bundles (1) is defined as $M_A$, and the total number of the bundles is defined as N. Further, in the determination, a carbon fiber bundle less than $8.5\times10^{-1}$ (mg/mm$^2$) is defined as a fiber bundle (2), and the total weight of carbon fiber bundles (2) is defined as $M_B$. The bundles each refined to a degree, which could not be extracted by a pincette, were measured in weight finally by getting them together. Further, when the fiber length is short and the measurement of weight is difficult, a manner may be employed wherein fiber lengths are classified at an interval of about 0.2 mm, a plurality of classified bundles are measured in weight by getting them together, and an average value thereof is used. All are classified, after the measurement, (Mn/Ln)/N is calculated with respect to each carbon fiber bundle (1) is calculate, and an average value X of Mn/Ln of carbon fiber bundles (1) is determined. Further, a proportion of carbon fiber bundles (1) to the total weight of carbon fiber bundles is determined by an equation: $M_A/(M_A+M_B)\times100$.

On the other hand, in the determination, carbon fiber bundles, whose number of single fibers forming each of the carbon fiber bundles $X_n$ is 90 or more, are represented as carbon fiber bundles (3), the total weight thereof is represented as $M_1$, and the total number of the bundles is represented as N. Further, in the determination, carbon fiber bundles, whose number of single fibers forming each of the carbon fiber bundles $X_n$ is less than 90, are represented as carbon fiber bundles (4), and the total weight of the carbon fiber bundles (4) is represented as $M_2$. The bundles each refined to a degree, which could not be extracted by a pincette, were measured in weight finally by getting them together. Further, when the fiber length is short and the measurement of weight is difficult, a manner may be employed wherein fiber lengths are classified at an interval of about 0.2 mm, a plurality of classified bundles are measured in weight by getting them together, and an average value thereof is used. All are classified, after the measurement, a number average of numbers of carbon fibers forming respective carbon fiber bundles (3) $x=\Sigma\{Mn/(Ln\times F)\}/N$, and a standard deviation of numbers of carbon fibers $x_n$ forming the carbon fiber bundles (3) $\sigma=\{1/N\times\Sigma(x_n-x)^2\}^{1/2}$, are calculated and, thus, the number average of numbers of carbon fibers forming the bundles "x" and the standard deviation a of numbers of carbon fibers "$x_n$" forming the carbon fiber bundles are determined. Where, N represents the total number of the carbon fiber bundles (3). Further, a proportion of carbon fiber bundles (3) to the total weight of carbon fiber bundles is determined by an equation: $M_1/(M_1+M_2)\times100$.

EXAMPLES

Hereinafter, Examples and Comparative Examples will be explained. First, carbon fiber bundles (A) to (E) used in Examples and Comparative Examples, and carding and air laid carried out using them, will be explained.

First, carding will be explained. As exemplified in FIG. 4, a carding machine 1 to card carbon fiber bundles mainly comprises a cylinder roll 2, a take-in roll 3 provided at an upstream side and closely to the outer circumferential surface of the cylinder roll 2, a doffer roll 4 provided closely to the outer circumferential surface of the cylinder roll 2 at a downstream side which is a side opposite to the side of the take-in roll 3, a plurality of worker rolls 5 provided closely to the outer circumferential surface of the cylinder roll 2 between the take-in roll 3 and the doffer roll 4, stripper rolls 6 provided closely to the worker rolls 5, and a feed roll 7 provided closely to the take-in roll 3, and a belt conveyer 8.

Carbon fiber bundles 9 cut at a predetermined length are supplied to belt conveyer 8, and the carbon fiber bundles 9 are introduced onto the outer circumferential surface of cylinder roll 2 through the outer circumferential surface of feed roll 7 and then through the outer circumferential surface of take-in roll 3. Up to this stage, the carbon fiber bundles are refined to some extent and become floc-like aggregates of carbon fiber bundles (carbon fiber aggregates). Although a part of the floc-like aggregates of carbon fiber bundles introduced onto the outer circumferential surface of cylinder roll 2 wind around the outer circumferential surface of worker rolls 5, these carbon fibers are stripped off by stripper rolls 6 and returned again onto the outer circumferential surface of the cylinder roll 2. Many needles, projections exist at standing conditions on the outer circumferential surfaces of the respective rolls of feed roll 7, take-in roll 3, cylinder roll 2, worker rolls 5 and stripper rolls 6, and in the above-described steps, by the operation of the needles, the carbon fiber bundles are refined into predetermined-condition bundles, and oriented to some extent. The carbon fiber bundles, refined into predetermined-condition bundles through such steps, move onto the outer circumferential surface of doffer roll 4 as a sheet-like web 10 which is one form of the carbon fiber aggregates.

Next, air laid will be explained. Air laid is a process of producing a non-woven fabric sheet of short fibers. As general air laid processes, included are Honshu Paper process, Kroyer process, Danweb process, J&J process, KC process, Scott process, etc. (refer to "Base and application of non-woven fabric" (Non-woven fabric seminar in Japan Fibrous Machine Society, published in 1993)).

Figure 5:
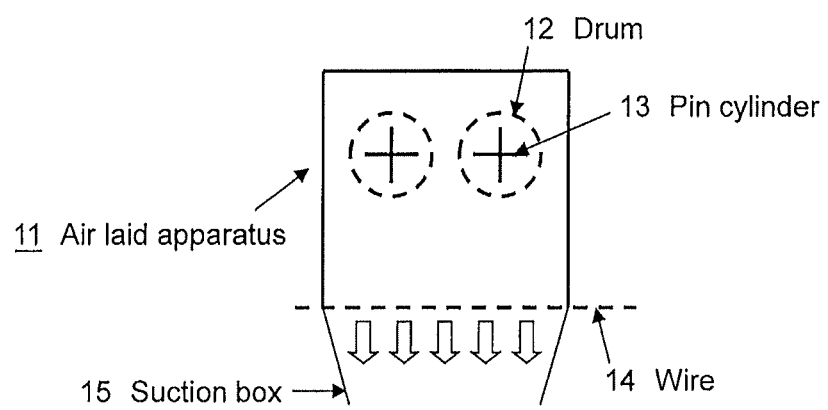
FIG. 5 is a schematic diagram of an air laid machine used in Examples.

For example, as shown in FIG. 5, air laid machine 11 has drums 12 rotated in directions reverse to each other, each formed in a cylinder shape and having small holes, and pin cylinders 13 provided in the respective drums 12. Carbon fiber bundle single materials or carbon fiber bundles and thermoplastic resin fibers are air transported to drums 12 together with a large amount of air, they are refined by pin cylinders 13 in drums 12, discharged from the small holes, and they drop onto wires 14 running thereunder. The air used for the air transportation is sucked into a suction box 15 provided under wires 14, and only refined carbon fiber bundle single materials or refined carbon fiber bundles and thermoplastic resin fibers are left on wires 14 to form a carbon fiber sheet.

Next, carbon fiber bundles (A) to (E) used in Examples and Comparative Examples will be explained.

Carbon Fiber Bundle (A):

The carbon fiber bundle (A) was prepared by providing 1.0 wt % of an aqueous sizing agent containing 100% component of polyethylene glycol diglycidylether (molecular weight=670) to a continuous carbon fiber bundle having a fiber diameter of 5.5 μm, a tensile elastic modulus of 294 GPa and a number of filaments of 24,000.

Carbon Fiber Bundle (B):

The carbon fiber bundle (B) was prepared by providing 1.0 wt % of a sizing agent containing 40% component of bisphenol A type epoxy resin (molecular weight=370), 40% component of bisphenol A type ethylene oxide maleic ester (molecular weight=2,500) and 20% component of an emulsifier to a continuous carbon fiber bundle having a fiber diameter of 7 μm, a tensile elastic modulus of 230 GPa and a number of filaments of 12,000.

Carbon Fiber Bundle (C):

The carbon fiber bundle (C) was prepared by providing 1.0 wt % of a sizing agent containing bisphenol A ethylene oxide adduct as its main component to a continuous carbon fiber bundle having a fiber diameter of 7 μm, a tensile elastic modulus of 230 GPa and a number of filaments of 12,000.

Carbon Fiber Bundle (D):

The carbon fiber bundle (D) was prepared without providing a sizing agent to a continuous carbon fiber bundle having a fiber diameter of 7 μm, a tensile elastic modulus of 230 GPa and a number of filaments of 12,000.

Carbon Fiber Bundle (E):

The carbon fiber bundle (E) was prepared by providing 0.5 wt % of a solvent-group sizing agent prepared by diluting glycerol triglycidylether with dimethyl formamide (hereinafter, abbreviated as DMF) to a continuous carbon fiber bundle having a fiber diameter of 7 μm, a tensile elastic modulus of 230 GPa and a number of filaments of 24,000.

Example 1

Figure 4:
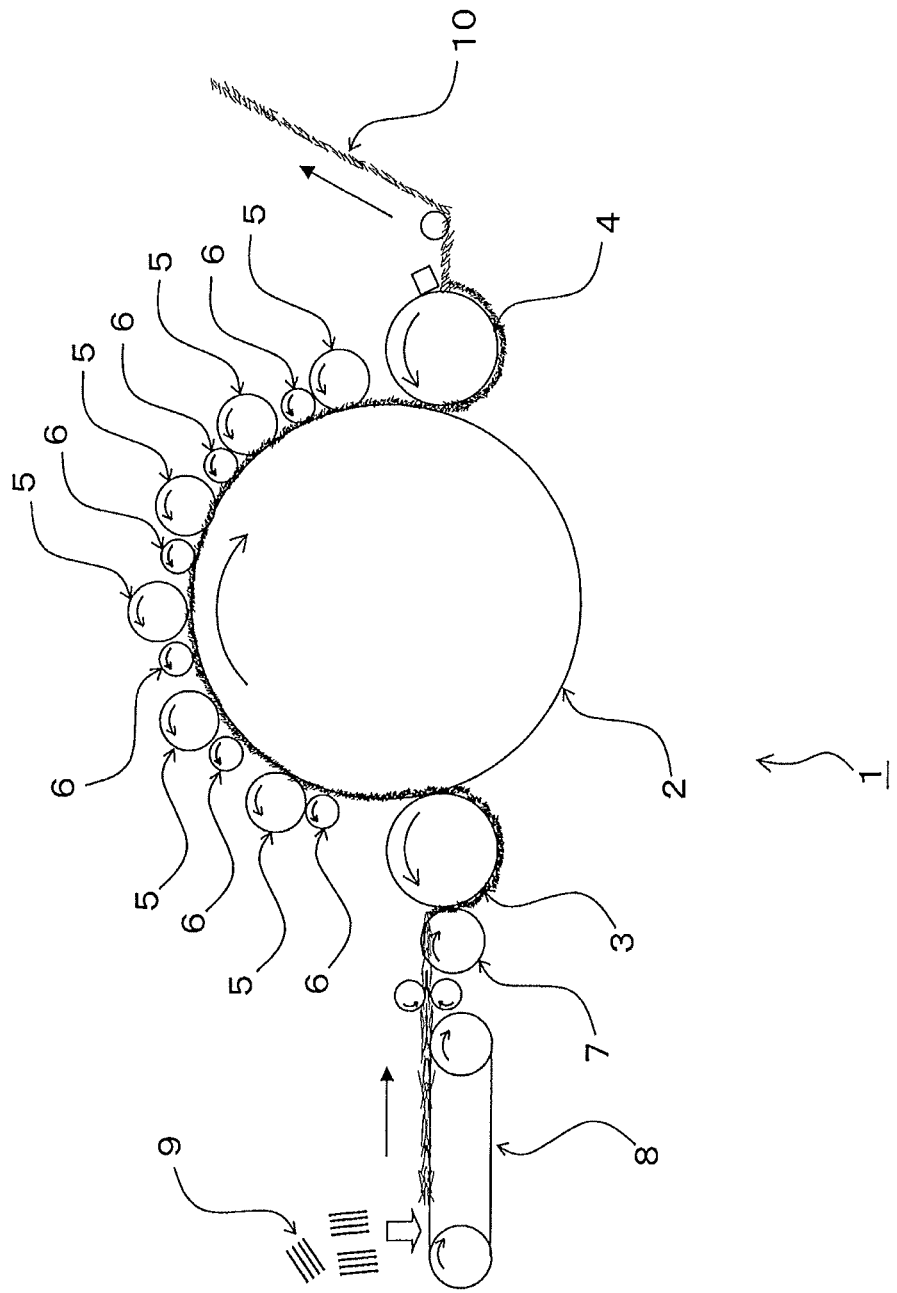
FIG. 4 is a schematic diagram of a carding machine used in Examples.

The carbon fiber bundle (A) was cut at a fiber length of 15 mm, the cut carbon fiber bundles and polyamide (nylon 6) short fibers (fineness of single fiber: 1.7 dtex, cut length: 51 mm, number of crimps: 12 crests per 25 mm, rate of crimp: 15%) were mixed at a mass ratio of 90:10, and the mixture was introduced into a carding machine such as one shown in FIG. 4. The web having come out was cross wrapped to form sheet-like carbon fiber aggregates comprising carbon fibers and nylon 6 fibers and having an areal weight of 100 g/m$^2$. The winding direction of the sheet-like carbon fiber aggregates was referred to as 0°, 12 sheets of the carbon fiber aggregates were stacked to form a structure of (0°/90°/0°/90°//0°/90°)s, and after a nylon resin melt blow non-woven fabric ("CM1001", resin viscosity ηr=2.3, supplied by Toray Industries, Inc.) was further stacked so that the volume ratio of the carbon fibers to the thermoplastic resin became 25:75, the whole was nipped by stainless plates, and after preheating at 240° C. for 90 seconds, it was hot pressed at 240° C. for 180 seconds while being applied with a pressure of 2.0 MPa. Then, it was cooled down to 50° C. at the pressed condition to obtain a flat plate of carbon fiber composite material having a thickness of 2 mm. When the obtained flat plate was served to the flow test, the coefficient of fluidity was 230% and it was excellent in flowability. Further, when the above-described flat plate was heated for about one hour in an electric furnace heated at 500° C. to burn off organic substances such as a matrix resin and the obtained carbon fiber mat was served to the tensile test, the work was $3.5 \times 10^{-3}$ [(N·mm)/(g/m$^2$)], the slope after reaching the maximum load was −0.018, and the initial load slope was 0.15. Further, the number average of numbers of carbon fibers forming the bundles "x" was 375, and the standard deviation σ was 192.

Example 2

The carbon fiber bundle (B) was cut at a fiber length of 15 mm, the cut carbon fiber bundles and the same nylon 6 short fibers as those used in Example 1 were introduced into a carding machine in a manner similar to that in Example 1, and the obtained web was cross wrapped to form sheet-like carbon fiber aggregates. The obtained sheet-like carbon fiber aggregates and a nylon resin melt blow non-woven fabric were stacked in a manner similar to that in Example 1 and, further, after hot pressing in a manner similar to that in Example 1, the hot pressed material was cooled to obtain a flat plate of carbon fiber composite material having a thickness of 2 mm. When the obtained flat plate was served to the flow test, the coefficient of fluidity was 217% and it was excellent in flowability. Further, when the above-described flat plate was heated for about one hour in an electric furnace heated at 500° C. to burn off organic substances such as a matrix resin and the obtained carbon fiber mat was served to the tensile test, the work was $8.4 \times 10^{-3}$ [(N·mm)/(g/m$^2$)], the slope after reaching the maximum load was −0.028, and the initial load slope was 0.43. Further, the number average of numbers of carbon fibers forming the bundles "x" was 336, and the standard deviation σ was 245.

Example 3

The carbon fiber bundle (C) was cut at a fiber length of 15 mm, the cut carbon fiber bundles and the same nylon 6 short fibers as those used in Example 1 were introduced into a carding machine in a manner similar to that in Example 1, and the obtained web was cross wrapped to form sheet-like carbon fiber aggregates. The obtained sheet-like carbon fiber aggregates and a nylon resin melt blow non-woven fabric were stacked in a manner similar to that in Example 1 and, further, after hot pressing in a manner similar to that in Example 1, the hot pressed material was cooled to obtain a flat plate of carbon fiber composite material having a thickness of 2 mm. When the obtained flat plate was served to the flow test, the coefficient of fluidity was 203% and it was excellent in flowability. Further, when the above-described flat plate was heated for about one hour in an electric furnace heated at 500° C. to burn off organic substances such as a matrix resin and the obtained carbon fiber mat was served to the tensile test, the work was $12.1 \times 10^{-3}$ [(N·mm)/(g/m$^2$)], the slope after reaching the maximum load was −0.062, and the initial load slope was 0.61. Further, the number average of numbers of carbon fibers forming the bundles "x" was 167, and the standard deviation σ was 63.

Example 4

The carbon fiber bundle (C) was cut at a fiber length of 25 mm, the cut carbon fiber bundles and the same nylon 6 short fibers as those used in Example 1 were introduced into a carding machine in a manner similar to that in Example 1, and the obtained web was cross wrapped to form sheet-like carbon fiber aggregates. The obtained sheet-like carbon fiber aggregates were stacked in a manner similar to that in Example 1, and a nylon resin melt blow non-woven fabric was further stacked thereto so that the volume ratio of the carbon fibers and the thermoplastic resin became 27:73, and thereafter, the stacked material was hot pressed and then cooled in a manner similar to that in Example 1 to obtain a flat plate of carbon fiber composite material having a thickness of 2 mm. When the obtained flat plate was served to the flow test, the coefficient of fluidity was 185% and it was excellent in flowability. Further, when the above-described flat plate was heated for about one hour in an electric furnace heated at 500° C. to burn off organic substances such as a matrix resin and the obtained carbon fiber mat was served to the tensile test, the work was $22.1 \times 10^{-3}$ [(N·mm)/(g/m$^2$)], the slope after reaching the maximum load was −0.035, and the initial load slope was 0.46. Further, the number average of numbers of carbon fibers forming the bundles "x" was 151, and the standard deviation σ was 59.

Example 5

The carbon fiber bundle (C) was cut at a fiber length of 50 mm, the cut carbon fiber bundles and the same nylon 6 short fibers as those used in Example 1 were introduced into a carding machine in a manner similar to that in Example 1, and the obtained web was cross wrapped to form sheet-like carbon fiber aggregates. The obtained sheet-like carbon fiber aggregates were stacked in a manner similar to that in Example 1, and a nylon resin melt blow non-woven fabric was further stacked thereto so that the volume ratio of the carbon fibers and the thermoplastic resin became 30:70, and thereafter, the stacked material was hot pressed and then cooled in a manner similar to that in Example 1 to obtain a flat plate of carbon fiber composite material having a thickness of 2 mm. When the obtained flat plate was served to the flow test, the coefficient of fluidity was 172% and it was excellent in flowability. Further, when the above-described flat plate was heated for about one hour in an electric furnace heated at 500° C. to burn off organic substances such as a matrix resin and the obtained carbon fiber mat was served to the tensile test, the work was $28.2 \times 10^{-3}$ [(N·mm)/(g/m$^2$)], the slope after reaching the maximum load was −0.022, and the initial load slope was 0.34. Further, the number average of numbers of carbon fibers forming the bundles "x" was 141, and the standard deviation σ was 54.

Example 6

The carbon fiber bundle (A) was cut at a fiber length of 10 mm, the cut carbon fiber bundles and polypropylene short fibers (fineness of single fiber: 1.7 dtex, cut length: 51 mm, number of crimps: 12 crests per 25 mm, rate of crimp: 17%) were mixed at a mass ratio of 90:10, and the mixture was introduced into a carding machine. The web having come out was cross wrapped to form sheet-like carbon fiber aggregates comprising carbon fibers and polypropylene fibers and having an areal weight of 100 g/m$^2$. The winding direction of the sheet-like carbon fiber aggregates was referred to as 0°, 12 sheets of the carbon fiber aggregates were stacked to form a structure of (0°/90°/0°/90°//0°/90°)s, and after a polypropylene resin melt blow non-woven fabric ("J1709QG", MFR=55 g/10 min., supplied by Prime Polymer Co., Ltd.) was further stacked so that the volume ratio of the carbon fibers to the thermoplastic resin became 35:65, the whole was nipped by stainless plates, and after preheating at 240° C. for 90 seconds, it was hot pressed at 240° C. for 180 seconds while being applied with a pressure of 2.0 MPa. Then, it was cooled down to 50° C. at the pressed condition to obtain a flat plate of carbon fiber composite material having a thickness of 2 mm. When the obtained flat plate was served to the flow test, the coefficient of fluidity was 207% and it was excellent in flowability. Further, when the above-described flat plate was heated for about one hour in an electric furnace heated at 500° C. to burn off organic substances such as a matrix resin and the obtained carbon fiber mat was served to the tensile test, the work was $18.1 \times 10^{-3}$ [(N·mm)/(g/m$^2$)], the slope after reaching the maximum load was −0.031, and the initial load slope was 0.38. Further, the number average of numbers of carbon fibers forming the bundles "x" was 394, and the standard deviation σ was 202.

Example 7

The carbon fiber bundle (E) was cut at a fiber length of 15 mm, the cut carbon fiber bundles and polyamide (nylon 6) short fibers (prepared by cutting long fibers with a fineness of single fiber of 1.7 dtex at a cut length of 5 mm) were mixed at a mass ratio of 90:10, and the mixture was introduced into an air laid machine such as one shown in FIG. 5 to form sheet-like carbon fiber aggregates comprising carbon fibers and nylon 6 fibers and having an areal weight of 100 g/m$^2$. The winding direction of the sheet-like carbon fiber aggregates was referred to as 0°, 12 sheets of the carbon fiber aggregates were stacked to form a structure of (0°/90°/0°/90°//0°/90°)s, and after a nylon 610 resin film ("CM2001", supplied by Toray Industries, Inc.) was further stacked so that the volume ratio of the carbon fibers to the thermoplastic resin became 25:75, the whole was nipped by stainless plates, and after preheating at 240° C. for 90 seconds, it was hot pressed at 240° C. for 180 seconds while being applied with a pressure of 1.0 MPa. Then, it was cooled down to 50° C. at the pressed condition to obtain a flat plate of carbon fiber composite material having a thickness of 2 mm. When the obtained flat plate was served to the flow test, the coefficient of fluidity was 298% and it was excellent in flowability. Further, when the above-described flat plate was heated for about one hour in an electric furnace heated at 500° C. to burn off organic substances such as a matrix resin and the obtained carbon fiber mat was served to the tensile test, the work was $2.9 \times 10^{-3}$ [(N·mm)/(g/m$^2$)], the slope after reaching the maximum load was −0.016, and the initial load slope was 0.16. Further, the number average of numbers of carbon fibers forming the bundles "x" was 382, and the standard deviation σ was 303.

Example 8

A flat plate of carbon fiber composite material having a thickness of 2 mm was obtained in a manner similar to that in Example 7 other than a condition where the carbon fiber bundle (E) was cut at a fiber length of 25 mm. When the obtained flat plate was served to the flow test, the coefficient of fluidity was 276% and it was excellent in flowability. Further, when the above-described flat plate was heated for about one hour in an electric furnace heated at 500° C. to burn off organic substances such as a matrix resin and the obtained carbon fiber mat was served to the tensile test, the work was $4.2 \times 10^{-3}$ [(N·mm)/(g/m$^2$)], the slope after reaching the maximum load was −0.025, and the initial load slope was 0.19. Further, the number average of numbers of carbon fibers forming the bundles "x" was 423, and the standard deviation σ was 379.

Comparative Example 1

The carbon fiber bundle (A) was cut at a fiber length of 45 mm, the cut carbon fiber bundles and polypropylene short fibers were mixed in a manner similar to that in Example 6, and carding and cross wrapping were carried out to form sheet-like carbon fiber aggregates comprising carbon fibers and polypropylene fibers and having an areal weight of 100 g/m$^2$. The sheet-like carbon fiber aggregates were stacked in a manner similar to that in Example 6, and after a polypropylene resin melt blow non-woven fabric was further stacked so that the volume ratio of the carbon fibers to the thermoplastic resin became 40:60, hot pressing and cooling were carried out in a manner similar to that in Example 6 to obtain a flat plate of carbon fiber composite material having a thickness of 2 mm. When the obtained flat plate was served to the flow test, the coefficient of fluidity was 160% and it was poor in flowability. Further, when the above-described flat plate was heated for about one hour in an electric furnace heated at 500° C. to burn off organic substances such as a matrix resin and the obtained carbon fiber mat was served to the tensile test, the work was $36.2 \times 10^{-3}$ [(N·mm)/(g/m$^2$)], the slope after reaching the maximum load was −0.008, and the initial load slope was 0.81. Further, the number average of numbers of carbon fibers forming the bundles "x" was 446, and the standard deviation σ was 402.

Comparative Example 2

The carbon fiber bundle (D) was cut at a fiber length of 15 mm, the cut carbon fiber bundles and the same nylon 6 short fibers as those used in Example 1 were introduced into a carding machine in a manner similar to that in Example 1, and the obtained web was cross wrapped to form sheet-like carbon fiber aggregates. The obtained sheet-like carbon fiber aggregates and a nylon resin melt blow non-woven fabric were stacked in a manner similar to that in Example 1 and, further, after hot pressing in a manner similar to that in Example 1, the hot pressed material was cooled to obtain a flat plate of carbon fiber composite material having a thickness of 2 mm. When the obtained flat plate was served to the flow test, the coefficient of fluidity was 165% and it was poor in flowability. Further, when the above-described flat plate was heated for about one hour in an electric furnace heated at 500° C. to burn off organic substances such as a matrix resin and the obtained carbon fiber mat was served to the tensile test, the work was $30.2 \times 10^{-3}$ [(N·mm)/(g/m$^2$)], the slope after reaching the maximum load was −0.12, and the initial load slope was 0.68. Further, the number average of numbers of carbon fibers forming the bundles "x" was 512, and the standard deviation σ was 360.

Figure 6:
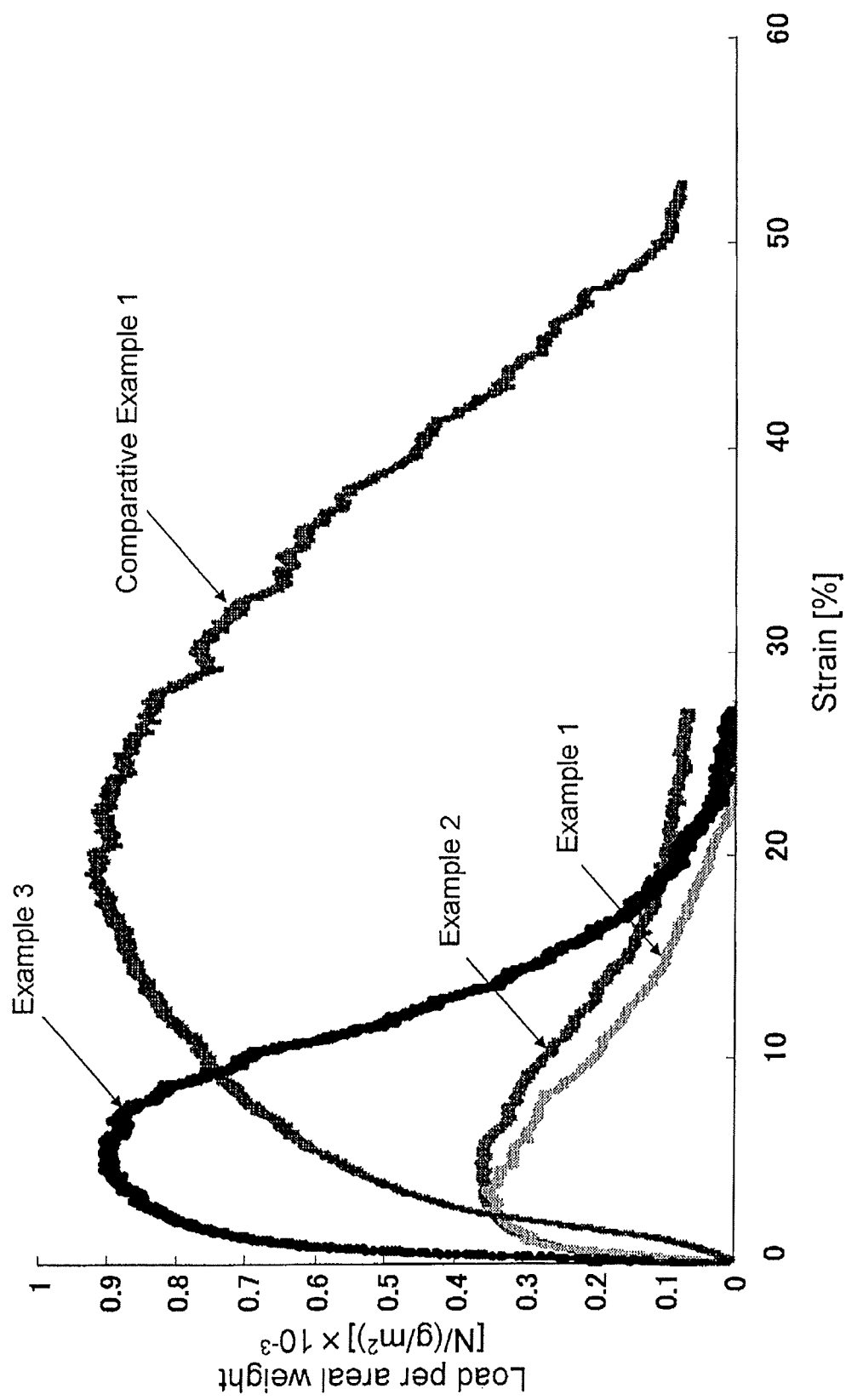
FIG. 6 is a graph showing load-strain curves which show the results of Examples 1-3 and Comparative Example 1.

In particular, load-strain curves representing the results of the above-described Examples 1-3 and Comparative Example 1 are shown in FIG. 6. As shown in FIG. 6, in Examples 1-3, as compared with Comparative Example 1, it is understood that our targeted properties can be obtained. The results of the above-described respective Examples and Comparative Examples are shown together in FIG. 1.

TABLE 1

|  | Example 1 | Example 2 | Example 3 | Example 4 | Example 5 | Example 6 | Example 7 | Example 8 | Comparative Example 1 | Comparative Example 2 |
| --- | --- | --- | --- | --- | --- | --- | --- | --- | --- | --- |
| Used carbon fiber bundle | (A) | (B) | (C) | (C) | (C) | (A) | (E) | (E) | (A) | (D) |
| D: Fiber diameter (μm) | 5.5 | 7 | 7 | 7 | 7 | 5.5 | 7 | 7 | 5.5 | 7 |
| L: Fiber length (mm) | 15 | 15 | 15 | 25 | 50 | 10 | 15 | 25 | 45 | 15 |
| Y: Proportion of carbon fiber bundle (1) (%) | 55 | 45 | 50 | 38 | 30 | 40 | 65 | 72 | 60 | 40 |
| X: Average value of Mn/Ln | 0.02 | 0.027 | 0.03 | 0.025 | 0.018 | 0.04 | 0.05 | 0.06 | 0.09 | 0.06 |
| x: Average value of number of fibers forming a bundle | 375 | 336 | 167 | 151 | 141 | 394 | 382 | 423 | 446 | 512 |
| σ: Standard deviation | 192 | 245 | 63 | 59 | 54 | 202 | 303 | 379 | 402 | 360 |
| Resin | CM1001 | CM1001 | CM1001 | CM1001 | CM1001 | J709QG | CM2001 | CM2001 | J709QG | CM1001 |
| Vf (%) | 25 | 25 | 25 | 27 | 30 | 35 | 30 | 25 | 40 | 25 |
| Coefficient of fluidity (%) | 235 | 217 | 203 | 185 | 172 | 207 | 298 | 276 | 160 | 165 |
| Work [(N · mm)/(g/m$^2$)] × 10$^{-3}$ | 3.5 | 8.4 | 12.1 | 22.1 | 28.2 | 18.1 | 2.9 | 4.2 | 36.2 | 30.2 |
| Slope after reaching maximum load [N/(g/m$^2$)] × 10$^{-3}$ | −0.018 | −0.028 | −0.062 | −0.035 | −0.022 | −0.031 | −0.016 | −0.025 | −0.008 | −0.12 |
| Initial load slope [N/(g/m$^2$)] × 10$^{-3}$ | 0.15 | 0.43 | 0.61 | 0.46 | 0.34 | 0.38 | 0.16 | 0.19 | 0.81 | 0.68 |

INDUSTRIAL APPLICABILITY

Our materials are suitable particularly to uses for carrying out molding into a relatively complicated shape by press molding of a carbon fiber composite material.

The invention claimed is:

1. A carbon fiber composite material comprising a carbon fiber sheet as a reinforcing material and a thermoplastic resin as a matrix resin, said carbon fiber sheet exhibiting a work per areal weight of $1\times10^{-3}$ to $30\times10^{-3}$ $[(N \cdot mm)/(g/m^2)]$ in a tensile test using a specimen having a width of 25 mm.

2. The carbon fiber composite material according to claim 1, wherein a slope after reaching the maximum load in a load $[N/(g/m^2)]\times10^{-3}$-strain [%] curve obtained in said tensile test of said carbon fiber sheet is −0.1 to −0.01.

3. The carbon fiber composite material according to claim 1, wherein a slope after applying an initial load in a load $[N/(g/m^2)]\times10^{-3}$-strain [%] curve obtained in said tensile test of said carbon fiber sheet is 0.1 to 0.7.

4. The carbon fiber composite material according to claim 1, wherein a fiber length of carbon fibers forming said carbon fiber sheet is 5 to 30 mm.

5. The carbon fiber composite material according to claim 1, wherein said carbon fiber sheet is formed from a starting material of a sheet-like carbon fiber aggregate formed from carbon fiber bundles cut at a predetermined length and thermoplastic resin short fibers.

6. The carbon fiber composite material according to claim 5, wherein a proportion Y, relative to the total weight of carbon fibers, of carbon fiber bundles for which $Mn/(Ln\times D)$ is $8.5\times10^{-1}$ (mg/mm$^2$) or more, is 30≤Y<90 (wt %), an average value X of Mn/Ln for said carbon fiber bundles is $1.1\times10^{-2} \le 8.1\times10^{-2}$ (mg/mm), and said Y satisfies Y≥100X+30, where Mn: weight of carbon fiber bundles, Ln: fiber length, D: fiber diameter.

7. The carbon fiber composite material according to claim 5, wherein with respect to said carbon fiber bundles forming said carbon fiber sheet, a number average "x" of numbers of carbon fibers forming carbon fiber bundles each having a weight of 0.01 mg or more and a number of carbon fibers of 90 or more for forming each carbon fiber bundle is 90 to 1,000/bundle, and a standard deviation a of said numbers of carbon fibers forming said carbon fiber bundles is 50 to 500.

8. The carbon fiber composite material according to claim 5, wherein a sizing agent is applied to said carbon fiber bundles.

9. The carbon fiber composite material according to claim 1, wherein a coefficient of fluidity, represented as a ratio of an area after being pressed at conditions of predetermined temperature and pressure to an area before being pressed, is 170% or more.

10. A carbon fiber reinforced plastic press molded with a carbon fiber composite material according to claim 1.

11. The carbon fiber composite material according to claim 2, wherein a slope after applying an initial load in a load $[N/(g/m^2)]\times10^{-3}$-strain [%] curve obtained in said tensile test of said carbon fiber sheet is 0.1 to 0.7.

12. The carbon fiber composite material according to claim 2, wherein a fiber length of carbon fibers forming said carbon fiber sheet is 5 to 30 mm.

13. The carbon fiber composite material according to claim 3, wherein a fiber length of carbon fibers forming said carbon fiber sheet is 5 to 30 mm.

14. The carbon fiber composite material according to claim 2, wherein said carbon fiber sheet is formed from a starting material of a sheet-like carbon fiber aggregate formed from carbon fiber bundles cut at a predetermined length and thermoplastic resin short fibers.

15. The carbon fiber composite material according to claim 3, wherein said carbon fiber sheet is formed from a starting material of a sheet-like carbon fiber aggregate formed from carbon fiber bundles cut at a predetermined length and thermoplastic resin short fibers.

16. The carbon fiber composite material according to claim 4, wherein said carbon fiber sheet is formed from a starting material of a sheet-like carbon fiber aggregate formed from carbon fiber bundles cut at a predetermined length and thermoplastic resin short fibers.

17. The carbon fiber composite material according to claim 6, wherein a sizing agent is applied to said carbon fiber bundles.

18. The carbon fiber composite material according to claim 7, wherein a sizing agent is applied to said carbon fiber bundles.

* * * * *